G. A. CURRIER.
CULTIVATOR.
APPLICATION FILED MAR. 14, 1918.

1,291,772. Patented Jan. 21, 1919.

WITNESS
W. A. Alexander.

INVENTOR.
G. A. Currier.
BY
E. E. Huffman
ATTORNEY.

UNITED STATES PATENT OFFICE.

GEORGE A. CURRIER, OF ST. LOUIS, MISSOURI.

CULTIVATOR.

1,291,772.

Specification of Letters Patent.   Patented Jan. 21, 1919.

Application filed March 14, 1918.   Serial No. 222,282.

*To all whom it may concern:*

Be it known that I, GEORGE A. CURRIER, a citizen of the United States of America, residing at the city of St. Louis, State of Missouri, United States of America, have invented a certain new and useful Cultivator, of which the following is such a full, clear, and exact description, as will enable any one skilled in the art to which it appertains to make and use the same, reference being had to the accompanying drawings, forming part of this specification.

My invention relates to a cultivator, and more particularly to a cultivator operating upon the rotary principle.

One object of my invention is to provide a cultivator of the type referred to, in which a pair of cutters may be adjusted toward and away from each other to accommodate rows of plants of varying width. Another object of my invention is to form each of the cutters with a plurality of blades which may be variously adjusted with relation to each other and to the line of travel of the cultivator, so as to adapt the cultivator for use under varying conditions.

Figure 1:
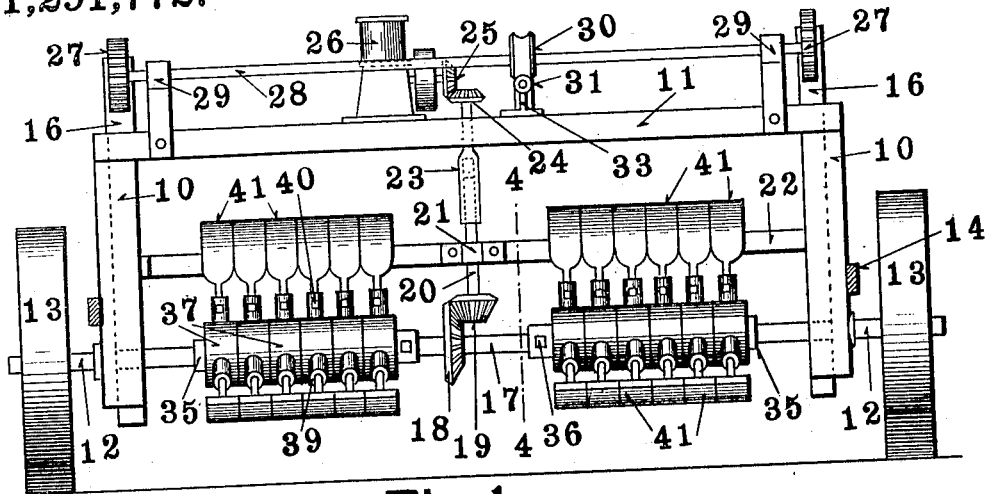
Figure 2:
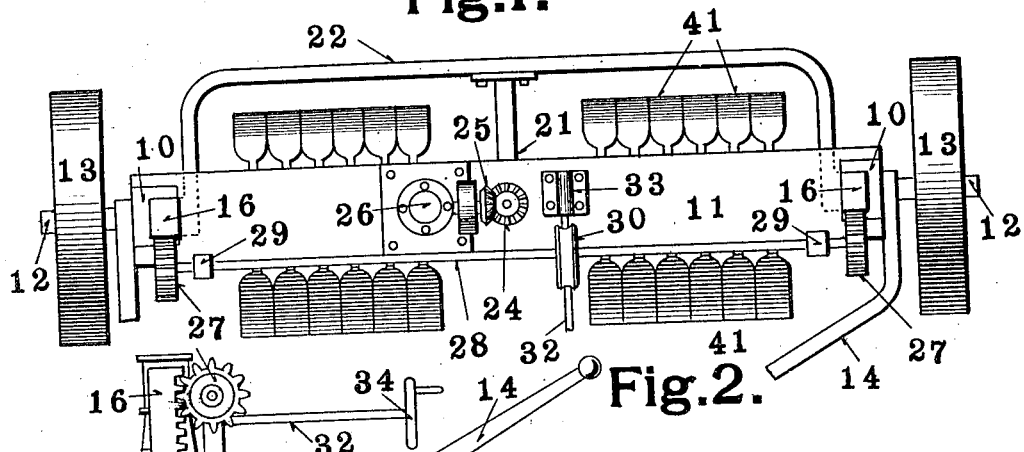
Figures 3, 4, 5:
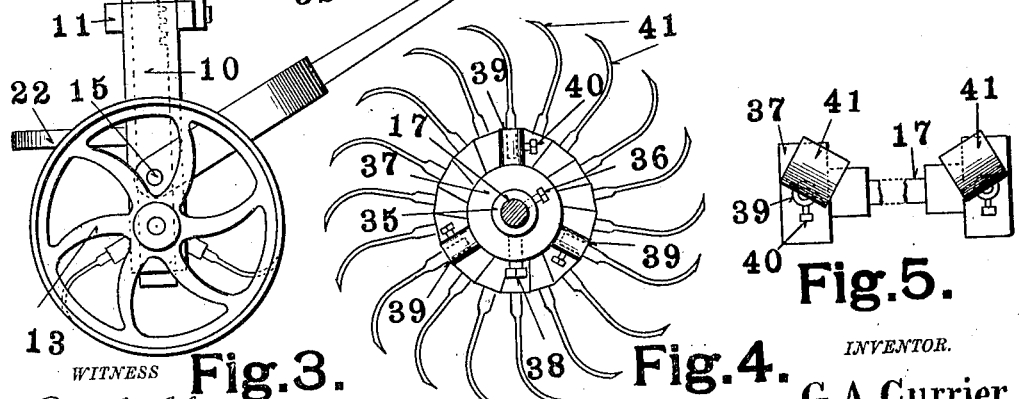

In the accompanying drawings, which illustrate one form of cultivator made in accordance with my invention, Figure 1 is a rear view, the handle being broken away; Fig. 2 is a top plan view; Fig. 3 is an end view; Fig. 4 is an enlarged section taken on the line 4—4 of Fig. 1, the cutting blades being shown in a different adjustment; and Fig. 5 is a diagrammatic view illustrating the manner of adjusting the angle of the face of the cutter blades relative to the line of travel of the cultivator.

The main frame of the cultivator consists of a pair of uprights 10 and a cross-piece 11. Secured to the uprights 10 are studs 12, upon which are carried the wheels 13 for supporting the cultivator. 14 represents a handle which is pivoted to the uprights 10 at 15, a best shown in Fig. 3 of the drawings. Sliding in the uprights 10 are a pair of rack bars 16, having journaled in their lower ends a shaft 17 which carries the cutters, as will be hereinafter described. The shaft 17 has mounted on it a bevel gear wheel 18 meshing with a bevel gear wheel 19, carried on a shaft 20, journaled in a bearing 21 carried by a frame 22, secured to the rack bars 16. The upper end of the shaft 20 is made angular in cross-section and telescopes with a hollow shaft 24. This shaft is carried by a cross-piece 11 and provided at its upper end with a bevel gear wheel 24, meshing with a bevel gear wheel 25, driven by a motor 26, which may be of any suitable type, and is carried by the cross-piece 11. In order to raise and lower the rack bars 16, and consequently the cutters, the said rack bars mesh with pinions 27 carried on a shaft 28, journaled in bearings 29, carried by the cross-piece 11. The shaft 28 is provided with a worm wheel 30 engaging with a worm 31, carried on a shaft 32, journaled in a bearing 33 on the cross-bar 11, and provided with a hand wheel 34, by means of which the cutters may be raised and lowered.

Mounted on the shaft 17, at each side of the gear wheel 18 is a sleeve 35 provided with set screws 36 by means of which the said sleeves may be adjusted toward and away from each other. Carried on each of the sleeves 35 are a number of hubs 37. In the drawings I have shown each sleeve as provided with six of these hubs. Each of the hubs 37 is provided with a set screw 38, by means of which the hubs may be adjusted around the sleeve 35 for a purpose to be hereinafter described. Each of the hubs 37 is provided with bosses 39, preferably three in number. Each of the bosses 39 is provided with a set screw 40, by means of which the shank of one of the cutting blades 41 is held in position in the boss. The shanks of the cutting blades 41 are round, so that the blades may be rotated in the boss to adjust the angle of its face relative to the axis of the shaft 17, and consequently to the line of travel of the cultivator. In Figs. 1 to 4 of the drawings I have shown the blades as arranged with their front faces parallel with the axis of the shaft 17 so as to throw the earth directly to the rear. If it is desired to throw the earth toward the rows of plants being cultivated, the set screws 40 may be loosened and the blades turned with their faces at an angle to the axis of the shaft 17, as shown in Fig. 5. If it is desired to throw the earth away from the rows of plants being cultivated, the blades 41 may be turned in the opposite direction to that indicated in Fig. 5.

In Figs. 1 and 2 of the drawings, I have shown the blades carried by the various hubs 37 as being brought into alinement so that each set of blades will act simultaneously. By loosening the set screws 38, by means of which the hubs 37 are secured to the sleeves 35, the said hubs may be adjusted to distribute the blades evenly around the periphery of the cutters, as illustrated in Fig. 4 of the drawings, or any other relative angular disposition of the blades may be secured to adapt the cultivator to various kinds of work. After the blades have been properly adjusted around the sleeve each cutter may be moved toward or away from the other by shifting the sleeves 35 longitudinally, without in any way interfering with the adjustment of the blades.

Having fully described my invention, what I claim as new and desire to secure by Letters Patent of the United States is:

1. In a cultivator, the combination with a power driven shaft, of a pair of sleeves on said shaft, means for adjusting the distance between said sleeves, a plurality of hubs adjustably carried by said sleeves, and blades carried by said hubs.

2. In a cultivator, the combination with a power driven shaft, a pair of sleeves on said shaft, means for adjusting the distance between said sleeves, a plurality of hubs carried on said sleeves, blades carried by said hubs, and means for varying the angle of the faces of said blades relative to the axis of said shaft.

3. In a cultivator, the combination with a power driven shaft, of a pair of sleeves carried by said shaft, means for adjusting the distance between said sleeves, a plurality of hubs carried by each of said sleeves, and means for independently adjusting the said hubs around said sleeves.

4. In a cultivator, the combination with a power driven shaft, of a pair of sleeves on said shaft, means for adjusting the distance between said sleeves, a plurality of hubs carried on each of said sleeves, means for adjusting said hubs around said sleeves, and blades carried by said hubs and adjustable around their longitudinal axes whereby the angle of the faces of said blades may be varied relatively to the axis of said shaft.

5. In a cultivator, the combination with power driven shaft, of a pair of sleeves on said shaft, means for adjusting the distance between said sleeves, a plurality of hubs carried on each of said sleeves, each of said hubs being provided with a plurality of projecting hollow bosses, blades provided with cylindrical shanks adapted to enter said bosses, and set screws for adjustably securing the shanks of said blades in said bosses.

In testimony whereof, I have hereunto set my hand and affixed my seal.

GEORGE A. CURRIER. [L. S.]

Copies of this patent may be obtained for five cents each, by addressing the "Commissioner of Patents, Washington, D. C."